(12) United States Patent
Petersen et al.

(10) Patent No.: US 6,308,179 B1
(45) Date of Patent: *Oct. 23, 2001

(54) USER LEVEL CONTROLLED MECHANISM INTER-POSITIONED IN A READ/WRITE PATH OF A PROPERTY-BASED DOCUMENT MANAGEMENT SYSTEM

(75) Inventors: Karin Petersen, Palo Alto; James P. Dourish; Warren K. Edwards, both of San Francisco; Anthony G. LaMarca, Redwood City; John O. Lamping, Los Altos; Michael P. Salisbury, Mountain View; Douglas B. Terry, San Carlos; James D. Thornton, Redwood City, all of CA (US)

(73) Assignee: Xerox Corporation, Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/143,551

(22) Filed: Aug. 31, 1998

(51) Int. Cl.$^7$ .................................................. G06F 17/00
(52) U.S. Cl. .................. 707/102; 707/2; 707/4; 707/6; 707/8; 707/10; 707/104
(58) Field of Search .................. 395/200.12; 707/1, 707/103, 10, 501, 522, 2, 4, 6, 8, 102, 104, 513; 345/326, 757

(56) References Cited

U.S. PATENT DOCUMENTS

| | | | |
|---|---|---|---|
| 5,299,123 | * 3/1994 | Wang et al. ............................. 707/2 |
| 5,692,141 | * 11/1997 | Kamisango et al. .................. 345/751 |
| 5,708,780 | * 1/1998 | Levergood et al. ............ 395/200.12 |
| 5,787,449 | * 7/1998 | Vulpe et al. .......................... 707/513 |
| 5,812,995 | * 9/1998 | Sasaki et al. ............................. 707/1 |
| 5,930,801 | * 7/1999 | Falkenhainer et al. .............. 707/103 |
| 5,978,818 | * 11/1999 | Lin ....................................... 707/501 |
| 5,987,459 | * 11/1999 | Swanson et al. ........................ 707/6 |
| 6,009,442 | * 12/1999 | Chen et al. ........................... 707/522 |
| 6,014,677 | * 1/2000 | Hayashi et al. ....................... 707/501 |
| 6,023,714 | * 2/2000 | Hill et al. ............................. 707/513 |
| 6,038,567 | * 3/2000 | Young .................................. 707/103 |
| 6,049,799 | * 4/2000 | Mangat et al. ......................... 707/10 |
| 6,070,162 | * 5/2000 | Miyasaka et al. ........................ 707/4 |
| 6,072,481 | * 6/2000 | Matsushita et al. ................. 345/326 |

\* cited by examiner

*Primary Examiner*—Wayne Amsbury
*Assistant Examiner*—Thuy Pardo
(74) *Attorney, Agent, or Firm*—Fay, Sharpe, Fagan, Minnich & McKee, LLP

(57) ABSTRACT

A user-level controlled mechanism is interposed into a read/write path of a computer system. The mechanism can be implemented as properties attached to documents. Documents having properties attached thereto have the capability of separating the content of the document from the properties which describe the document. This separation of the document content from its properties allows for a user-level access and control of the properties thereby allowing a user flexibility in organizing, storing and retrieving documents. The mechanism allows a user to arrange collections of documents wherein a single document may appear in multiple collections. The properties of the present invention are user and document specific in the sense that they are associated with the user which attached the properties and are directed to control of specific documents.

24 Claims, 9 Drawing Sheets

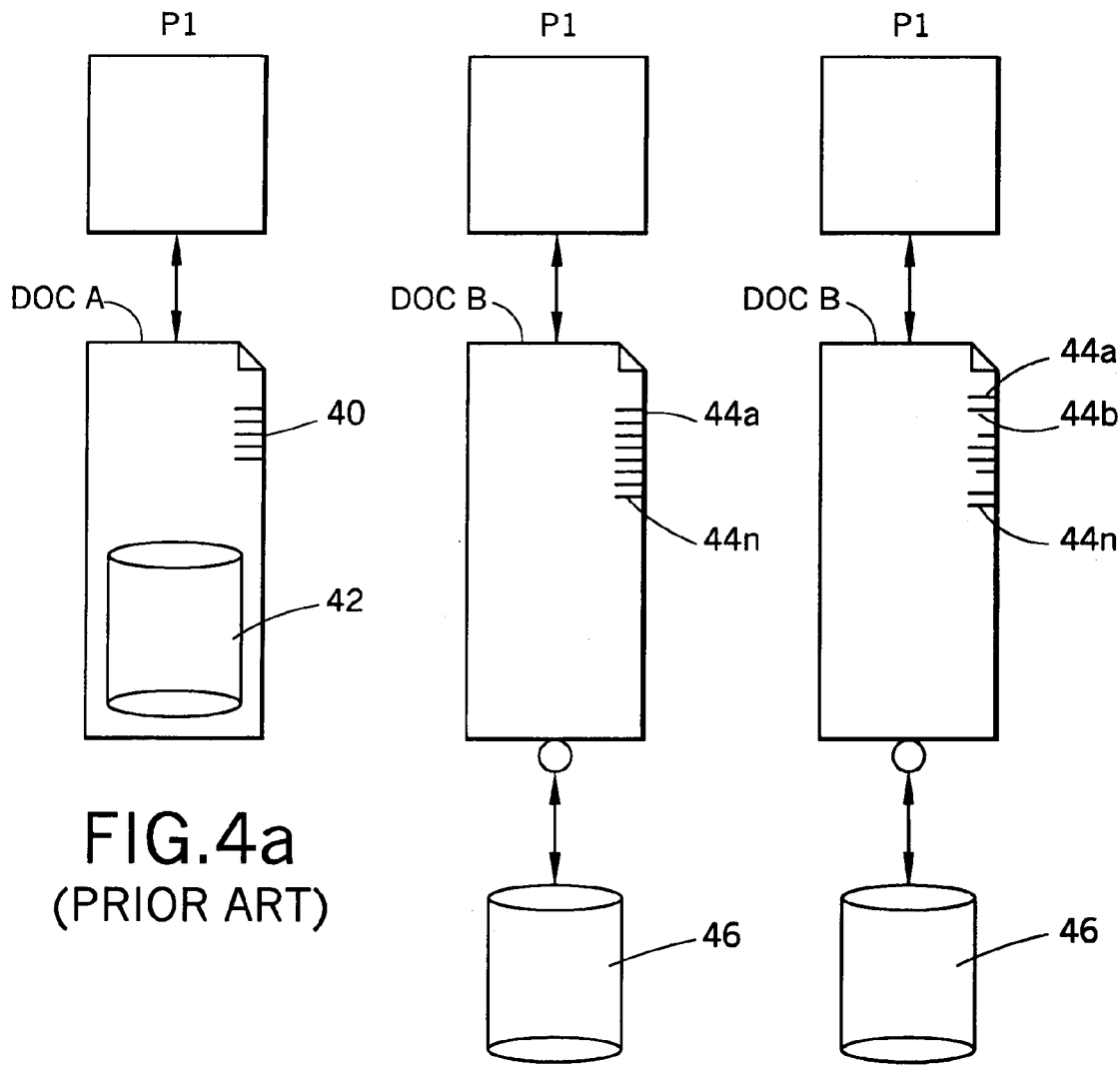

```
package test;

import java.util.Enumeration;
import DMS.db.*;
import DMS.db.client.*;

public class testprogram {
public static void main (String args []) {

// Connect to the DMS database.
  DMS.startMysqlDatabase ();

// Create a query for the documents we want, and generate
  // a DocList containing all matching documents in the database.
  Query q = new Query("project = DMS");
  DocList docs = q.find();

// Iterate through the doclist, setting a property for each
  // document.
  for (Enumeration e = docs. elements(); e.hasMoreElements ();) {
  DMSItem p = (DMS.Item e.nextElement();
  p.setAttribute("coolness", "high");
  }
  //Create a new collection
  Collection c = null;
  try {
   c = DMS.createCollection ();
  } catch (DMS.DBException e) {
   System.err.println (e) ;
   System.exit(1);
  }

// Name the collection.
  c.setAttribute (DMS Item.NameField, "cool documents");

/ / Set the query that specifies the collection membership.
  c.setQuery(new Query ("coolness = high");
  System.out.println(c.getDocuments().size() + = items");

System.exit(0);

USER LEVEL CONTROLLED MECHANISM INTER-POSITIONED IN A READ/WRITE PATH OF A PROPERTY-BASED DOCUMENT MANAGEMENT SYSTEM

The following applications are related to the present application:

U.S. Ser. No. 09/143,802, Anthony G. LaMarca, et al., entitled USER LEVEL ACCESSING OF LOW-LEVEL COMPUTER SYSTEM OPERATIONS now U.S. Pat. No. 6,266,670, U.S. Ser. No 09/143,778 , Douglas B. Terry, et al., entitled A PROPERTY-BASED MECHANISM FOR FLEXIBLY SUPPORTING FRONT-END AND BACK-END COMPONENTS HAVING DIFFERENT COMMUNICATION PROTOCOLS now U.S. Pat. No. 6,269,380; U.S. Ser. No. 09/144,143, Warren K. Edwards, et al., entitled ATOMIC AND MOLECULAR DOCUMENTS now pending; U.S. Ser. No. 09/143,555, Michael P. Salisbury, et al, entitled VIRTUAL DOCUMENTS now pending; U.S. Ser. No. 09/144,383, John O. Lamping, et al, entitled SELF CONTAINED DOCUMENT MANAGEMENT BASED ON DOCUMENT PROPERTIES now pending; U.S. Ser. No. 09/143,773, James D. Thornton, et al., entitled SERVICE INTERACTION USING PROPERTIES ATTACHED TO DOCUMENTS now U.S. Pat. No. 6,240,429; U.S. Ser. No. 09/144,231, James P. Dourish, et al., entitled ACTIVE PROPERTIES FOR DYNAMIC SYSTEM CONFIGURATION now U.S. Pat. No. 6,253,217; U.S. Ser. No. 09/143,777, Warren K. Edwards, et al., entitled EXTENDING APPLICATION BEHAVIOR THROUGH DOCUMENT PROPERTIES now pending; U.S. Ser. No. 09/143,772, Michael P. Salisbury, et al., entitled MAINTAINING DOCUMENT IDENTITY ACROSS FILE SYSTEM INTERFACES now pending; U.S. Ser. No. 09/144,032, Anthony G. LaMarca, et al, entitled CLUSTERING RELATED FILES IN A DOCUMENT MANAGEMENT SYSTEM now U.S. Pat. No. 6,266,682.

Each of the above applications filed Aug. 31, 1998 and assigned to a common assignee are hereby incorporated by reference.

BACKGROUND OF THE INVENTION

The present invention pertains to the art of document management systems and more particularly to a distributed document infrastructure where documents are organized and managed in terms of a user level controlled mechanism inter-positioned in a read/write path of the system. This mechanism can be implemented as properties attached to documents. These properties are user and document specific in the sense that they are associated with the user which attached the properties and are directed to control of specific documents. This structure allows for the separation of the location of the document content from the document's management, which is described by its properties. Implementation of the properties eliminates the need to adhere to traditional file system and folder hierarchies, where the storage and retrieval of documents are based on a storage location. The present invention simplifies the manner in which people access, share, and manage document collections of documents by raising the level of abstraction away from low-level concepts such as disc drives, file servers, and directory names towards higher level and more human oriented concepts. A user associates high-level properties with documents while leaving the specific decisions of how best to provide these properties to the document management system of the present invention.

The inventors have recognized that a large amount of a user's interaction with a computer has to do with document management, such as storing, filing, organizing and retrieving information from a variety of electronic documents. These documents may be found on a local disc, on a network system file server, an e-mail file server, the world wide web, or a variety of other locations. Modern communication delivery systems have had the effect of greatly increasing the flow of documents which may be incorporated within a user's document space, thereby increasing the need for better tools to visualize and interact with the accumulated documents.

The most common tools for organizing a document space rely on a single fundamental mechanism known as hierarchical storage systems, wherein documents are treated as files that exist in directories or folders, which are themselves contained in other directories, thereby creating a hierarchy that provides the structure for document space interactions. Each directory in a hierarchy of directories, will commonly contain a number of individual files. Typically, files and directories are given alpha-numeric, mnemonic names in large storage volumes shared via a network. In such a network, individual users may be assigned specific directories.

A file located in a sub-directory is located by its compound path name. For example, character string D:\TREE\LIMB\BRANCH\TWIG\LEAF.FIL could describe the location of a file LEAF.FIL whose immediate directory is TWIG and which is located deep in a hierarchy of files on the drive identified by the letter D. Each directory is itself a file containing file name, size, location data, and date and time of file creation or changes.

Navigation through a file system, to a large degree, can be considered as navigation through semantic structures that have been mapped onto the file hierarchy. Such navigation is normally accomplished by the use of browsers and dialog boxes. Thus, when a user traverses through the file system to obtain a file (LEAF.FIL), this movement can be seen not only as a movement from one file or folder to another, but also as a search procedure that exploits features of the documents to progressively focus on a smaller and smaller set of potential documents. The structure of the search is mapped onto the hierarchy provided by the file system, since the hierarchy is essentially the only existing mechanism available to organize files. However, documents and files are not the same thing.

Since files are grouped by directories, associating a single document with several different content groupings is cumbersome. The directory hierarchy is also used to control the access to documents, with access controls placed at every node of the hierarchy, which makes it difficult to grant file access to only one or a few people. In the present invention, separation of a document's inherent identity from its properties, including its membership in various document collections, alleviates these problems.

Other drawbacks include that existing hierarchical file systems provide a "single inheritance" structure. Specifically, files can only be in one place at a time, and so can occupy only one spot in the semantic structure. The use of links and aliases are attempts to improve upon such a limitation.

Thus, while a user's conception of a structure by which files should be organized may change over time, the hierarchy described above is fixed and rigid. While moving individual files within such a structure is a fairly straight-forward task, reorganizing large sets of files is much more complicated, inefficient and time consuming. From the foregoing it can be seen that existing systems do not address a user's need to alter a file structure based on categories which change over time. At one moment a user may wish to organize the document space in terms of projects, while at some time in the future the user may wish to generate an organization according to time and/or according to document content. A strict hierarchical structure does not allow management of documents for multiple views in a seamless manner resulting in a decrease in the efficiency of document retrieval.

Existing file systems also support only a single model for storage and retrieval of documents. This means a document is retrieved in accordance with a structure or concepts given to it by its author. On the other hand, a user who is not the author may wish to retrieve a document in accordance with a concept or grouping different from how the document was stored.

Further, since document management takes place on a device having computational power, there would be benefits to harnessing the computational power to assist in the organization of the documents. For example, by attaching a spell-checker property to a document, it can extend the read operation of a document so that the content returned to the requesting application will be correctly spelled.

The inventors are aware that others have studied the area of document management/storage systems.

DMA is a proposed standard from AIIM designed to allow document management systems from different vendors to interoperate. The DMA standard covers both client and server interfaces and supports useful functionality including collections, versioning, renditions, and multiple-repository search. A look at the APIs show that DMA objects (documents) can have properties attached to them. The properties are strongly typed in DMA and must be chosen from a limited set (string, int, date . . . ) To allow for rich kinds of properties, one of the allowable property types is another DMA object. A list type is allowed to build up big properties. Properties have a unique IDs in DMA. Among the differences which exist to the present invention, is the properties are attached to documents without differentiation about which user would like to see them; properties are stored in the document repository that provides the DMA interface, not independently from it. Similarly, DMA does not provide support for active properties.

WebDAV is another interface designed to allow an extended uniform set of functionality to be attached with documents available through a web server. WebDAV is a set of extensions to the HTTP 1.1 protocol that allow Web clients to create and edit documents over the Web. It also defines collections and a mechanism for associating arbitrary properties with resources. WebDav also provides a means for creating typed links between any two documents, regardless of media type where previously, only HTML documents could contain links. Compared to the present invention, although WebDAV provides support for collections, these are defined by extension (that is all components have to be explicitly defined); and although it provides arbitrary document properties, these live with the document itself and cannot be independently defined for different users, furthermore there is no support for active properties and are mostly geared toward having ASCII (or XML) values.

DocuShare is a simple document management system built as a web-server by Xerox Corporation. It supports simple collections of documents, limited sets of properties on documents and support for a few non-traditional document types like calendars and bulletin boards. It is primarily geared toward sharing of documents of small, self-defined groups (for the latter, it has support to dynamically create users and their permissions.) DocuShare has notions of content providers, but these are not exchangeable for a document. Content providers are associated with the type of the document being accessed. In DocuShare properties are static, and the list of properties that can be associated with a document depends on the document type. Users cannot easily extend this list. System administrators must configure the site to extend the list of default properties associated with document types, which is another contrast to the present invention. Also, in DocuShare properties can be visible to anyone who has read access for the collection in which the document is in. Properties are tightly bound to documents and it is generally difficult to maintain a personalized set of properties for a document, again a different approach than the one described in the present invention.

The paper, "Finding and Reminding: File Organization From the Desktop", D. Barreau and B. Nardi, SIGCHI Bulletin, 27 (3) July, 1995, reviews filing and retrieval practices and discusses the shortcomings of traditional file and retrieval mechanisms. The paper illustrates that most users do not employ elaborate or deep filing systems, but rather show a preference for simple structures and "location-based searches", exploiting groupings of files (either in folders, or on the computer desktop) to express patterns or relationships between documents and to aid in retrieval.

In response to the Barreau article, the article, "Find and Reminding Reconsidered", by S. Fertig, E. Freeman and D. Gelernter, SIGCHI Bulletin, 28(1) January, 1996, defends deep structure and search queries, observing that location-based retrieval is, "nothing more than a user-controlled logical search." There is, however, one clear feature of location-based searching which adds to a simple logical search—in a location-based system, the documents have been subject to some sort of pre-categorization. Additional structure is then introduced into the space, and this structure is exploited in search and retrieval.

The article "Information Visualization Using 3D Interactive Animation", by G. Robertson, S. Card and J. Mackinlay, Communications of the ACM 36 (4) April, 1993, discusses a location-based structure, an interesting feature is that it is exploited perceptually, rather than cognitively. This moves the burden of retrieval effort from the cognitive to the perceptual system. While this approach may be effective, the information that the systems rely on is content-based, and extracting this information to find the structure can be computationally expensive.

The article "Using a Landscape Metaphor to Represent a Corpus of Documents," Proc. European Conference on Spatial Information Theory, Elba, September, 1993, by M. Chalmers, describes a landscape metaphor in which relative document positions are derived from content similarity metrics.

A system, discussed in "Lifestreams: Organizing your Electronic Life", AAAI Fall Symposium: AI Applications in Knowledge Navigation on Retrieval (Cambridge, Mass.), E. Freeman and S. Fertig, November, 1995, uses a timeline as the major organizational resource for managing document spaces. Lifestreams is inspired by the problems of a standard single-inheritance file hierarchy, and seeks to use contextual information to guide document retrieval. However, Lifestreams replaces one superordinate aspect of the document (its location in the hierarchy) with another (its location in the timeline).

The article "Semantic File Systems" by Gifford et al., Proc. Thirteenth ACM Symposium of Operating Systems Principals (Pacific Grove, Calif.) October, 1991, introduces the notion of "virtual directories" that are implemented as dynamic queries on databases of document characteristics. The goal of this work was to integrate an associating search/retrieval mechanism into a conventional (UNIX) file system. In addition, their query engine supports arbitrary "transducers" to generate data tables for different sorts of files. Semantic File System research is largely concerned with direct integration into a file system so that it could extend the richness of command line programming interfaces, and so it introduces no interface features at all other than the file name/query language syntax. In contrast, the present invention is concerned with a more general paradigm based on a distributed, multi-principal property-based system and with how interfaces can be revised and augmented to deal with it; the fact that the present invention can act as a file system is simply in order to support existing file system-based applications, rather than as an end in itself DLITE is the Stanford Digital Libraries Integrated Task Environment, which is a user interface for accessing digital library resources as described in "The Digital Library Integrated Task Environment" Technical Report SIDL-WP-1996-0049, Stanford Digital Libraries Project (Palo Alto, Calif.) 1996, by S. Cousins et al. DLITE explicitly reifies queries and search engines in order to provide users with direct access to dynamic collections. The goal of DLITE, however, is to provide a unified interface to a variety of search engines, rather than to create new models of searching and retrieval. So although queries in DLITE are independent of particular search engines, they are not integrated with collections as a uniform organizational mechanism.

Multivalent documents define documents as comprising multiple "layers" of distinct but intimately-related content. Small dynamically-loaded program objects, or "behaviors", activate the content and work in concert with each other and layers of content to support arbitrarily specialized document types. To quote from one of their papers, "A document management infrastructure built around a multivalent perspective can provide an extensible, networked system that supports incremental addition of content, incremental addition of interaction with the user and with other components, reuse of content across behaviors, reuse of behaviors across types of documents, and efficient use of network bandwidth."

Multivalent document behaviors (analogs to properties) extend and parse the content layers, each of which is expressed in some format. Behaviors are tasked with understanding the formats and adding functionality to the document based on this understanding. In many ways, the Multivalent document system is an attempt at creating an infrastructure that can deal with the document format problem by incrementally adding layers of "understanding" of various formats. In contrast, the present invention has an explicit goal of exploring and developing a set of properties that are independent of document format. While properties could be developed that could parse and understand content, it is expected that most will be concerned with underlying storage, replication, security, and ownership attributes of the documents. Included among the differences between the present invention and the Multivalent concepts are that, the Multivalent document system focuses on extensibility as a tool for content presentation and new content-based behaviors; the present invention focuses on extensible and incrementally-added properties as a user-visible notion to control document storage and management.

File systems known as the Andrew File System (AFS), Coda, and Ficus provide a uniform name space for accessing files that may be distributed and replicated across a number of servers. Some distributed file systems support clients that run on a variety of platforms. Some support disconnected file access through caching or replication. For example, Coda provides disconnected access through caching, while Ficus uses replication. Although the immediately described distributed file systems support document (or file) sharing, they have a problem in that a file's hierarchical pathname and its storage location and system behavior are deeply related. The place in the directory hierarchy where a document gets stored generally determines on which servers that file resides.

Distributed databases such as Oracle, SQL Server, Bayou, and Lotus Notes also support shared, uniform access to data and often provide replication. Like some distributed file systems, many of today's commercial databases provide support for disconnected operation and automatic conflict resolution. They also provide much better query facilities than file systems. However, distributed databases suffer the same problems as file systems in that the properties of the data, such as where it is replicated and how it is indexed and so on, are generally associated with the tables in which that data resides. Thus, these properties cannot be flexibly managed and updated. Also, the set of possible properties is not extensible.

A digital library system, known as the Documentum DocPage repository, creates a document space called a "DocBase." This repository stores a document as an object that encapsulates the document's content along with its attributes, including relationships, associated versions, renditions, formats, workflow characteristics, and security. These document objects can be infinitely combined and re-combined on demand to form dynamic configurations of document objects that can come from any source.

DocPage supports organization of documents via folder and cabinet metaphors, and allows searching over both document content and attributes. The system also provides checkin/checkout-style version control, full version histories of documents, and annotations (each with its own attributes and security rules). The system also supports workflow-style features including notification of updates. DocBase uses a replicated infrastructure for document storage (see: http://www.documentum.com)

Among the key differences between Documentum DocPage and the present invention are: First, in the present system properties are exposed as a fundamental concept in the infrastructure. Further, the present system provides for a radically extensible document property infrastructure capable of supporting an aftermarket in document attributes. Documentum seems to be rather closed in comparison; the possible attributes a document can acquire are defined a priori by the system for a particular application environment and cannot be easily extended. Second, Documentum does not have the vision of universal access to the degree of the present invention which supports near-universal access to document meta-data, if not document content. In comparison, the scope of Documentum narrows to document access within a closed setting (a corporate intranet).

SUMMARY OF THE INVENTION

The present invention contemplates a new and improved manner of accessing documents by a user of a computer system. The user is provided access to properties by use of a document management system of the computer system. The user attaches selected properties to a document. The document with the attached properties is then stored at a location separate from the content of the document. The content of the document is stored at a location outside of the document management system. Thereafter, a user may retrieve the document using at least one of the attached properties, such retrieving including obtaining the content of the document from outside of the document management system. The storage of the content separate from the properties is part of the separate management of the properties and content.

With attention to a more limited aspect of the present invention, a second user is provided with access to properties. The second user may attach selected ones of such properties to a second document. These properties do not need to be the same as those selected by the first user. The second document is considered a reference document of the first document, which is considered a base document. The content of the second document is the content of the first document. Property sets of different users are managed independently and are therefore not immediately accessible to each other unless explicitly requested.

With attention to yet another aspect of the present invention, the properties attached to the documents may be one of static properties or active properties. Static properties being one of tags and name-value pairs associated with the document, and active properties including code which allows the use of computational power to either alter the document to which it is attached or effect another change within the document management system.

Turning attention to another aspect of the present invention, a user of the document management system may attach properties to a plurality of documents. In this manner the user forms collections of documents in accordance with properties attached to the documents, wherein documents having the same property are included in the same collection. A single document may appear in multiple collections.

With attention to yet another aspect of the present invention, a query can be instituted across the properties of the document management system, wherein documents having a property attached corresponding to the query are returned and form a document collection.

With attention to still yet another aspect of the present invention, an inclusion list is provided to override the results of the query by allowing addition of a document to a collection which was not returned by the query. An exclusion list is provided to override the results of the query by deleting a document in the collection which was returned by the query.

A principle advantage of the present invention is that it provides for a distributed document infrastructure where documents are organized and managed in terms of a user-level controlled mechanism interposed in a content and property read/write path of the computer system. The mechanism provided can be implemented as properties which are attached to the document. Use of the mechanism allows for a separation of the location of the document content from the document's management, which is described by its properties. Use of such a user-level control mechanism moves control of access to documents to a user level rather than to a level lower within the computer system which is only accessible by a programmer or developer.

Yet another advantage of the present invention is the elimination of the need to adhere to traditional file system and folder hierarchies where the storage and retrieval of documents are based on a storage location and the inherent identity of the document.

Still other advantages and benefits will become apparent to those skilled in the art upon a reading and understanding of the following detailed description.

DESCRIPTION OF THE DRAWINGS

The invention may take physical form in certain parts and arrangement of parts, a preferred embodiment of which will be described in detail in this specification and illustrated in the accompanying drawings which form a part hereof, and wherein:

FIG. 4a illustrates the concepts of an existing storage system;

FIG. 4b is a block diagram showing a concept of the present invention wherein content of a document is separated from its properties;

FIG. 4c further illustrates the concepts of and expands upon those shown in FIG. 4b;

FIG. 6b illustrates one embodiment of code for creating a property and its attachment to a document;

DETAILED DESCRIPTION OF THE PREFERRED EMBODIMENTS

Figure 1:
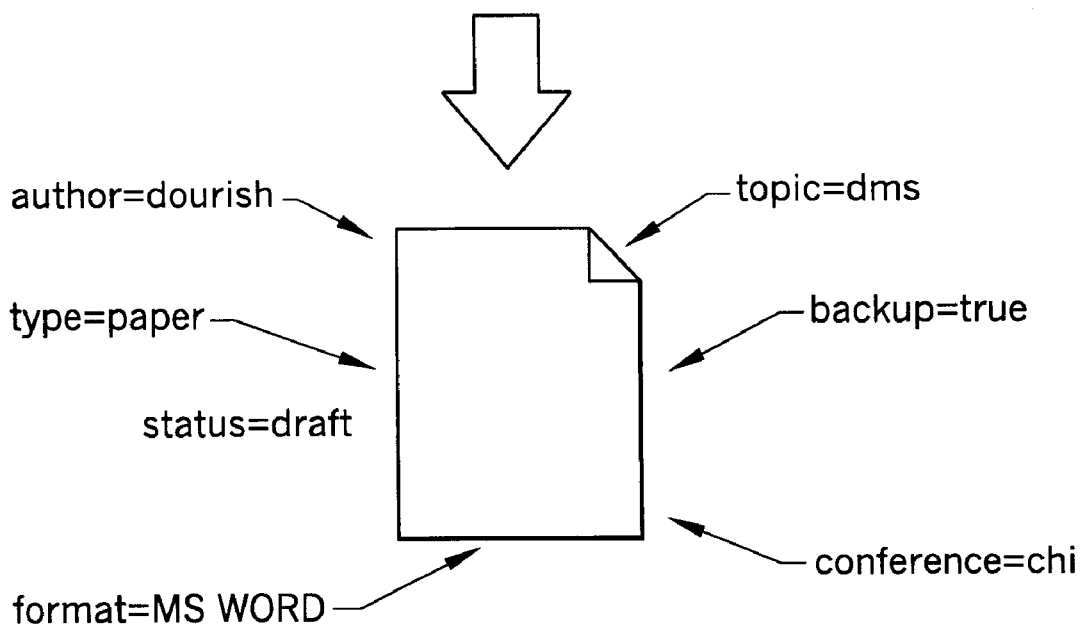
FIG. 1 shows a hierarchical storage mechanism compared to the concept of properties of the present invention.

Prior to discussing the present invention in greater detail, it is believed a glossary of terms used in the description would be beneficial. Therefore, the following definitions are set forth:

Action: The behavior part of a property.

Active Property: A property in which code allows the use of computational power to either alter the document or effect another change within the document management system.

Arbitrary: Ability to provide any property onto a document.

Base Document: Corresponds to the essential bits of a document. There is only one Base Document per document. It is responsible for determining a document's content and may contain properties of the document, and it is part of every principal's view of the document.

Base Properties: Inherent document properties that are associated with a Base Document.

Bit Provider: A special property of the base document. It provides the content for the document by offering read and write operations. It can also offer additional operations such as fetching various versions of the document, or the encrypted version of the content.

Browser: A user interface which allows a user to locate and organize documents.

Collection: A type of document that contains other documents as its content.

Combined
Document: A document which includes members of a collection and content.

Content: This is the core information contained within a document, such as the words in a letter, or the body of an e-mail message.

Content
Document: A document which has content.

Distributed: Capability of the system to control storage of documents in different systems (i.e., file systems, www, e-mail servers, etc.) in a manner invisible to a user. The system allows for documents located in multi-repositories to be provided to a principal without requiring the principal to have knowledge as to where any of the document's content is stored.

DMS: Document Management System

Document: This refers to a particular content and to any properties attached to the content. The content referred to may be a direct referral or an indirect referral. The smallest element of the DMS. There are four types of documents; Collection, Content Document, No-Content Document and Combined Document.

Document
Handle: Corresponds to a particular view on a document, either the universal view, or that of one principal.

DocumentID: A unique identifier for each BaseDocument. A ReferenceDocument inherits the DocumentID from its referent. Document identity is thus established via the connections between ReferenceDocument and BaseDocument. Logically, a single document is a BaseDocuments and any ReferenceDocuments that refer to it.

Kernel: Manages all operations on a document. A principal may have more than one kernel.

Multi-Principal: Ability for multiple principals to have their own set of properties on a Base Document wherein the properties of each principal may be different.

Notification: Allows properties and external devices to find out about operations and events that occur elsewhere in DMS.

No Content
Document: A document which contains only properties.

Off-the-Shelf
Applications: Existing applications that use protocols and document storage mechanisms provided by currently operating systems.

Principal: A "User" of the system. Each person or thing that uses the document management system is a principal. A group of people can also be a principal. Principals are central because each property on a document can be associated with a principal. This allows different principals to have different perspectives on the same document.

Property: Some bit of information or behavior that can be attached to content. Adding properties to content does not change the content's identity. Properties are tags that can be placed on documents, each property has a name and a value (and optionally a set of methods that can be invoked).

Property
Generator: Special case application to extract properties from the content of a document.

Reference
Document: Corresponds to one principal's view of a document. It contains a reference to a Base Document (Reference Document A refers to Base Document B) and generally also contains additional properties. Properties added by a Reference Document belong only to that reference; for another principal to see these properties, it must explicitly request them. Thus, the view seen by a principal through his Reference Document is the document's content (through the Base Document), and a set of properties (both in the reference and on the Base Document). Even an owner of a Base Document can also have a Reference Document to that base, in which he places personal properties of the document that should not be considered an essential part of the document and placed in all other principal's view.

Space: The set of documents (base or references) owned by a principal.

Static Property: A name-value pair associated with the document. Unlike active properties, static properties have no behavior. Provides searchable meta-data information about a document.

Introduction

As discussed in the background of the invention, the structure that file systems provide for managing files becomes the structure by which users organize and interact with documents. However, documents and files are not the same thing. The present invention has as an immediate goal to separate management of properties related to the document or concerning the document from the management of the document content. Therefore, user-specific document properties are managed close to the document consumer or user of the document rather than where the document is stored. Separation of the management of user properties from the document content itself provides the ability to move control of document management from a closed file system concept to a user-based methodology.

FIG. 1 illustrates a distinction between hierarchical storage systems whose documents are organized in accordance with their location described by a hierarchical structure and the present invention where documents are organized according to their properties (e.g. author-dourish, type=paper, status=draft, etc.). This means documents will retain properties even when moved from one location to another, and that property assignment can have a fine granularity.

Figure 2:
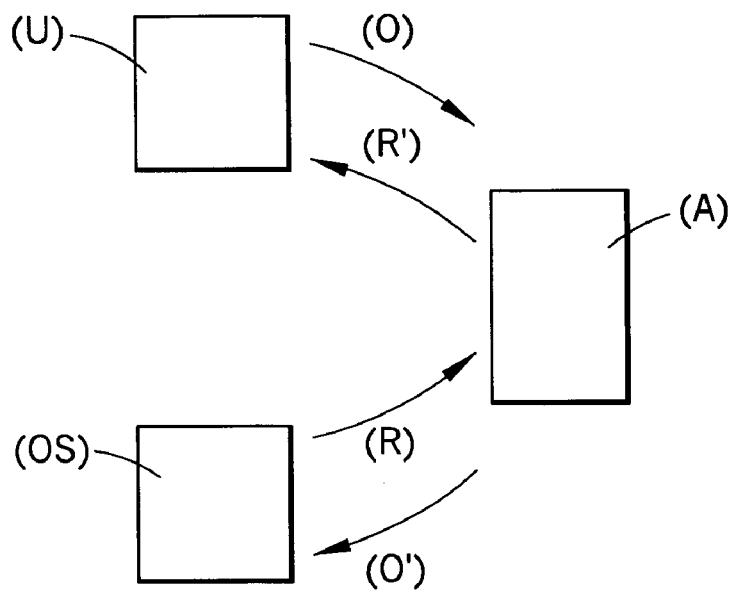
FIG. 2 is a block diagram of a document management system according to the present invention, interposed within a communication channel between a user and an operating system.

To integrate properties within the document management system of the present invention, the properties need to be presented within the content and/or property read/write path of a computer system, with the ability to both change the results of an operation as well as take other actions. The outline of the concept is described in FIG. 2, where once user (U) issues an operation request (O), prior to that operation being performed by operating system (OS), a call is made to document management system (DMS) A of the present invention, which allows DMS A to function so as to achieve the intended concepts of the present invention. This includes having DMS A interact with operating system (OS), through its own operation request (O'). Once operation request (O') is completed, the results are returned (R) to DMS A which in turn presents results (R') to user (U).

With these basic concepts having been presented, a more detailed discussion of the invention is set forth below.

Document Management System (DMS) Architecture in a DMS-Aware Environment

Figure 3:
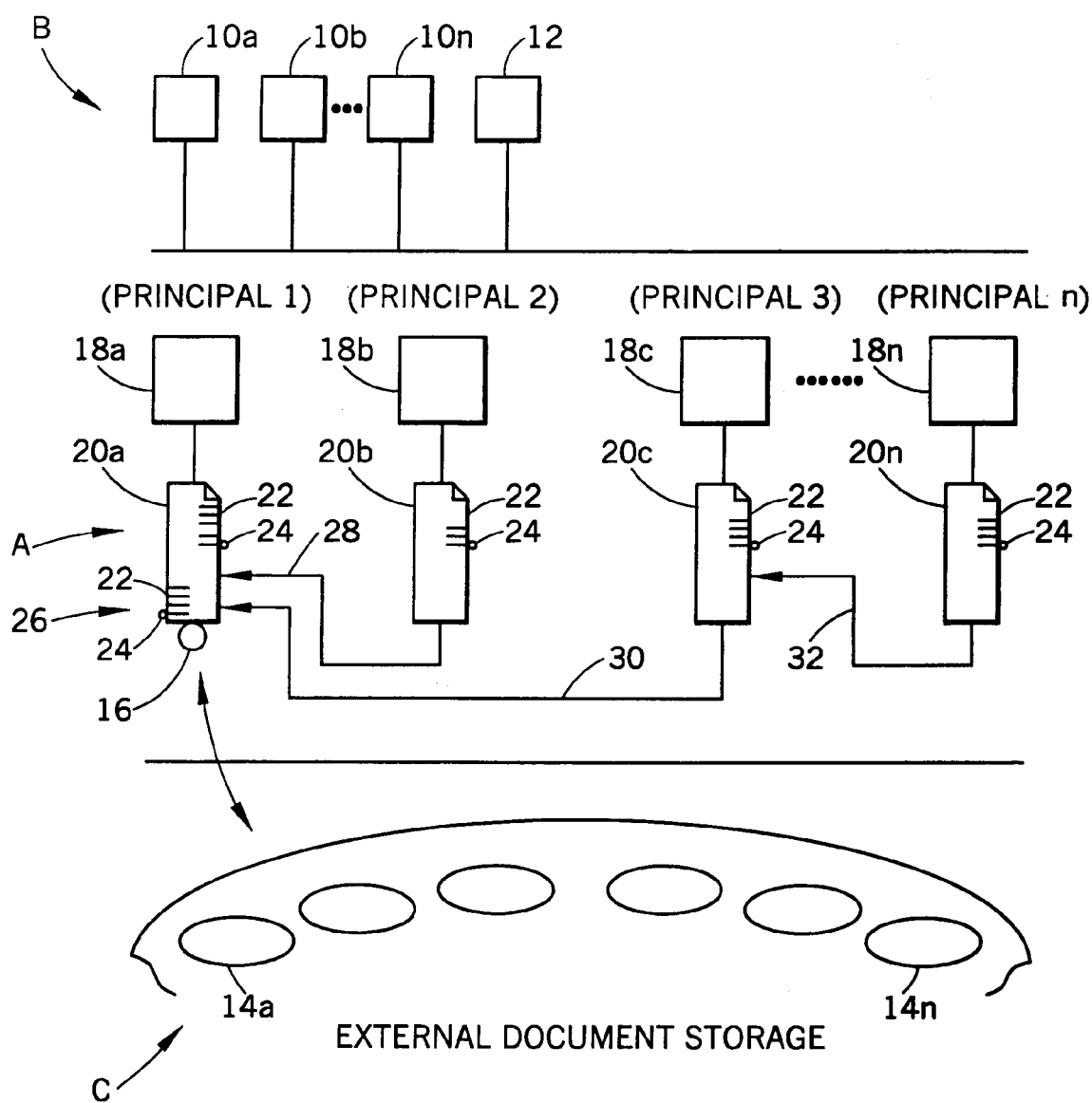
FIG. 3 is a representation of a document management system of the present invention implemented in a computer system which is DMS-aware.

FIG. 3 sets forth the architecture of a document management system (DMS) A of the present invention. In FIG. 3, an assumption is made that the environment is a DMS-aware environment. This means the protocols for storing and retrieving data and otherwise interacting with DMS A are uniform. Particularly, DMS A has been developed to allow its architecture to be extended such that DMS protocols and code can be used in DMS-aware applications, and DMS-aware repositories. It is appreciated by the inventors however, and will be explained in greater detail below, that the present invention achieves additional benefits by being able to interact with existing legacy systems including applications and file systems which are not DMS aware.

Document management system (DMS) A is shown connected for operation with front-end components B, and back-end components C. Front-end components B include DMS-aware applications 10a–10n, such as word processing applications, mail applications among others. Browser 12 (considered a specialized form of application) is also designed for use with DMS A.

Similarly, back-end components C can include a plurality of repositories 14a–14n, where the content of documents are stored. Such repositories can include the hard disc of a principal's computer, a file system server, a web page, a dynamic real time data transmission source, as well as other data repositories. Since DMS A can receive data from various repositories, bit provider 16 is used to supply data to DMS A.

Principals 1–n each have their own kernel 18a–18n for managing documents, such as documents 20a–20n. Documents 20a–20n are considered to be documents the corresponding principal 1–n has brought into its document management space. Particularly, they are documents that a principal considers to be of value and therefore has in some manner marked as a document of the principal. The document, for example, may be a document which the principal created, it may be an e-mail sent or received by the principal, a web page found by the principal, a real-time data input such as an electronic camera forwarding a continuous stream of images, or any other form of electronic data (including video, audio, text, etc.) brought into the DMS document space. Each of the documents 20a–20n have static properties 22 and/or active properties 24 placed thereon.

Document 20a, is considered to be a base document and is referenced by reference documents 20b–20c. As will be discussed in greater detail below, in addition to base document 20a having static properties 22 and/or active properties 24, base document 20a will also carry base properties 26 which can be static properties 22 and/or active properties 24 (Static properties are shown with a—and active properties are shown with a—o).

Reference documents 20b–20c are configured to interact with base document 20a. Both base documents and reference documents can also hold static properties 22 and/or active properties 24. When principals 2,3 access base document 20a for the first time, corresponding reference documents 20b–20c are created under kernels 18b–18c, respectively. Reference documents 20b–20c store links 28 and 30 to unambiguously identify their base document 20a. In particular, in the present invention each base document is stored with a document ID which is a unique identifier for that document. When reference documents 20b–20c are created, they generate links to the specific document ID of their base document. Alternatively, if principal n references reference document 20c, reference document 20n is created with a link 32 to reference document 20c of Principal 3. By this link principal n will be able to view (i.e. its document handle) the public properties principal 3 has attached to its reference document 20c as well as the base properties and public reference properties of base document 20a. This illustrates the concept of chaining.

The above described architecture allows for sharing and transmission of documents between principals and provides the flexibility needed for organizing documents. With continuing attention to FIG. 3, it is to be noted at this point that while links 28–30 are shown from one document to another, communication within DMS A is normally achieved by communication between kernels 18a–18n. Therefore, when DMS A communicates with either front-end components B, back-end components C, or communication occurs between principals within DMS A, this communication occurs through kernels 18a–18n. It is however, appreciated the invention will work with other communication configurations as well.

Using the described architecture, DMS A of the present invention does not require the principal to operate within a strict hierarchy such as in file or folder-type environments. Rather, properties 22,24 which are attached to documents allows a principal to search and organize documents in accordance with how the principal finds it most useful.

For instance, if principal 1 (owner of kernel 18a) creates a base document with content, and stores it within DMS A, and principal 2 (owner of kernel 18b) wishes to use that document and organize it in accordance with its own needs, principal 2 can place properties on Reference Document 20b. By placement of these properties, principal 2 can retrieve the base document in a manner different than that envisioned by principal 1.

Further, by interacting with browser 12, a principal may run a query requesting all documents having a selected property. Specifically, a user may run query language requests over existing properties. Use of browser 12 will be discussed in greater detail in the following sections.

Therefore, a point of the present invention is that DMS A manages a document space where properties are attached by different principals such that actions occur which are appropriate for a particular principal, and are not necessarily equivalent to the organizational structure of the original author of a document or even to other principals.

Another noted aspect of the present invention is that since the use of properties separates a document's inherent identity from its properties, from a principal's perspective, instead of requiring a document to reside on a single machine, documents in essence can reside on multiple machines (base document 20a can reside on all or any one of kernels 18a–18n). Further, since properties associated with a document follow the document created by a principal (for example, properties on document 20b of kernel 18b, may reference base document 20a), properties of document 20b will run on kernel 18b, even though the properties of document 20b are logically associated with base document 20a. Therefore, if a property associated with document 20b (which references base document 20a) incurs any costs due to its operation, those costs are borne by kernel 18b (i.e. principal 2), since properties are maintained with the principal who put the properties onto a document.

Illustrations regarding concepts of the present invention are set forth in FIGS. 4a–4e. The basic idea of existing file systems is illustratively depicted in FIG. 4a. Specifically, document A represents existing systems which has its identity information (i.e. in a hierarchical form) 40 carried with its content 42. On the other hand, FIG. 4b which illustrates a concept of the present invention, shows that properties 44a–44n are separated from the content 46 of document B. This separation of a document's content from its descriptive properties allows for management of documents without regard to the physical location of the document. Using this advantage, a principal, may associate document B with other documents in the form of a collection and retrieve and store documents in accordance with the properties rather than the strict hierarchical storage requirements of existing file systems.

For example, traditional file systems will presume that a document's location and name together constitute its identity, and any document appearing with that name in that location is therefore considered that document. However, this is not true in the present invention, wherein collection memberships are variable, the name is just another property, and the properties are the critical components for finding documents.

Expanding upon the concept shown in FIG. 4b, attention is directed to FIG. 4c. It is first assumed document B includes as one of its properties "document related to DMS", 44a, and as another property "documents created in 1998", 44b. Then if the principal wishes to create a collection of all "documents related to DMS" and another to those "documents created in 1998", document B would be found in both collections. This again points out a distinct aspect of this property-based system. Specifically, introduced to the interactive experience is that documents can appear in multiple places at the same time. This means a document can be a member of multiple collections at the same time and so two collections can display the same document concurrently.

Figure 4D:
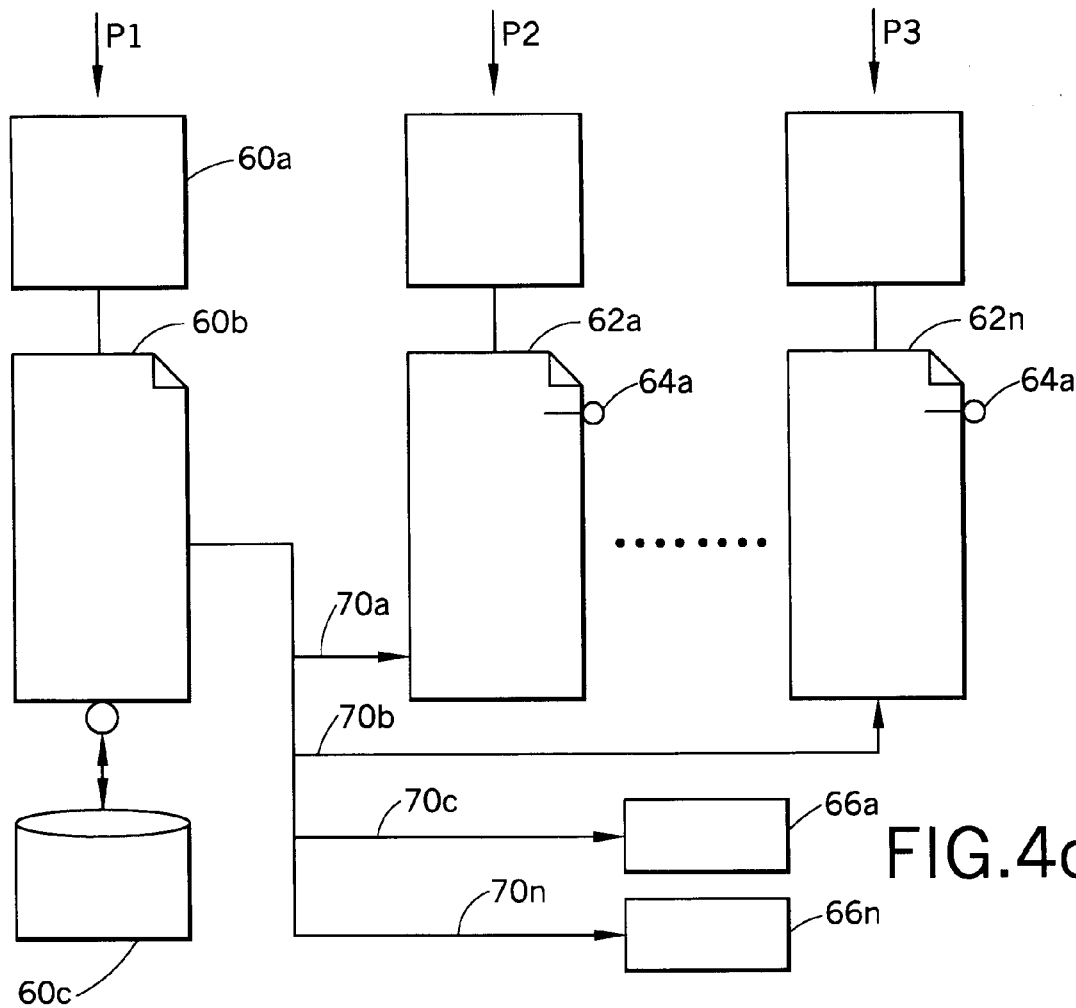
FIG. 4d depicts the notification aspect of properties in the present invention.

Turning attention to FIG. 4d, a further concept of the present invention is illustrated, directed to notification of active properties when an operation occurs which is of interest to the active property. Principal 1 initiates an operation through kernel 60a to retrieve a document 60b whose content is in storage repository 60c. In the present invention it is possible that principal 2 and principal 3 have documents 62a–62n to which they have attached active properties 64a–64n, respectively with regard to document 60b. It is also possible that some external sources (such as a service, pager, e-mail provider, etc.) 66a–66n have an interest in document 60b. Under this scenario, when principal 1 issues the operation request, a notification 70a–70n is sent to other documents 62a–62n and external sources 66a–66n. If any documents 62a–62n or external sources 66a–66n are designed to function in light of this particular operation request, these elements will then perform their function. For example, property 64a may indicate "inform each time document 62b is accessed" and external source 66a may send an e-mail to "Joe" each time document 62b is accessed. Once principal 1 initiates an operation to access document 62b, these active properties or external sources are notified.

Another operation which could occur is that an author, such as principal 1, determines to delete the document to which principals 2 and 3 have attached properties. In the present embodiment, the properties will be maintained in existence and when principal 2 or principal 3 attempt to retrieve the content of the deleted document, an indication is sent that the content has been deleted. An alternative configuration would be to send information that such a document is to be deleted and allow an opportunity to copy the document. Other alternatives are also possible.

Figure 4E:
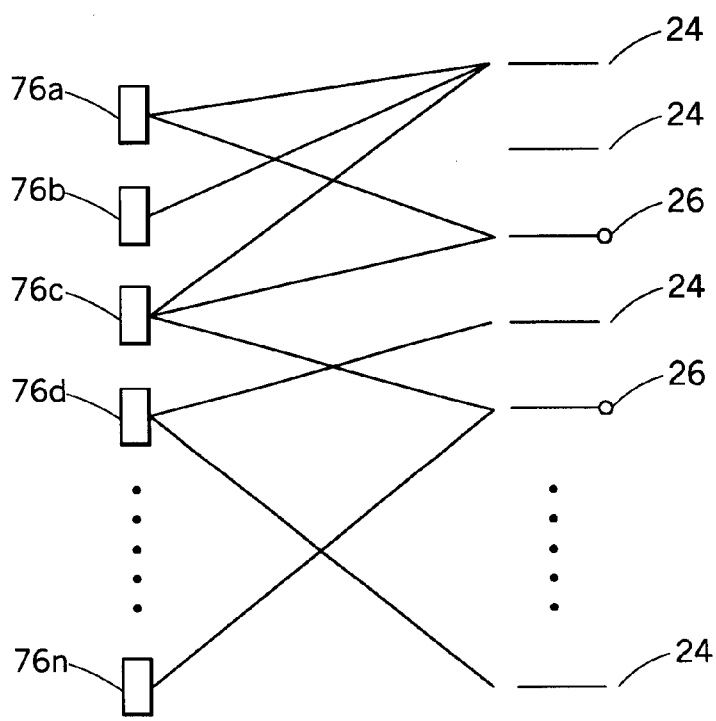
FIG. 4e illustrates the relationship between operations within a computer system and the properties of the present invention.

FIG. 4e further expands upon the concept of operations acting as trigger events for initiation of properties. Computer systems have predefined operations. Among these are content read operations 76a, edit operations 76b, view operations 76c, save operations 76d, and other well known defined operations. The interaction between the operations and properties such as static properties 22 and active properties 24 show that an operation can be associated with more than one property and properties in turn can be associated with more than one operation. This is accomplished by including calls to different operations when constructing a specific property.

From the preceding discussion, it is to be appreciated that in existing systems, there is a strong division between different areas of responsibility. For example, an operating system will have distinct responsibilities from applications and a file system will have additionally defined, encapsulated responsibilities and capabilities. For example, applications can't normally take over operations defined as those of the file system. However, the present invention allows applications (in the form of active properties) to become involved in functionality which is normally encapsulated within an existing legacy file system storage layer. Specifically, active properties can declare themselves interested in or have something to offer with respect to a particular performance of an operation. These active properties are coded to become invoked when a particular operation occurs.

The foregoing is intended to illustrate ways in which document sharing, collection, and arrangement can occur when the identification of documents are based on the document properties separate from the content of the documents.

In accordance with the foregoing, interaction with the document space is based on meaningful properties of documents, rather than the structure in which documents were filed. Using document properties in this manner means that interaction is more strongly connected to the user's immediate concerns and the task at hand rather than an extrinsic structure. In addition, the structure of the document space reflects changes in the state of documents, rather than simply their state when they were filed. However, collections still appear inside collections, and standard filing information—such as document ownership, modification dates, file types, etc.—are still preserved by the present system, appearing as document properties maintained by the infrastructure. Thus, a principal can recapture more traditional forms of structured interaction with document spaces.

Figure 5:
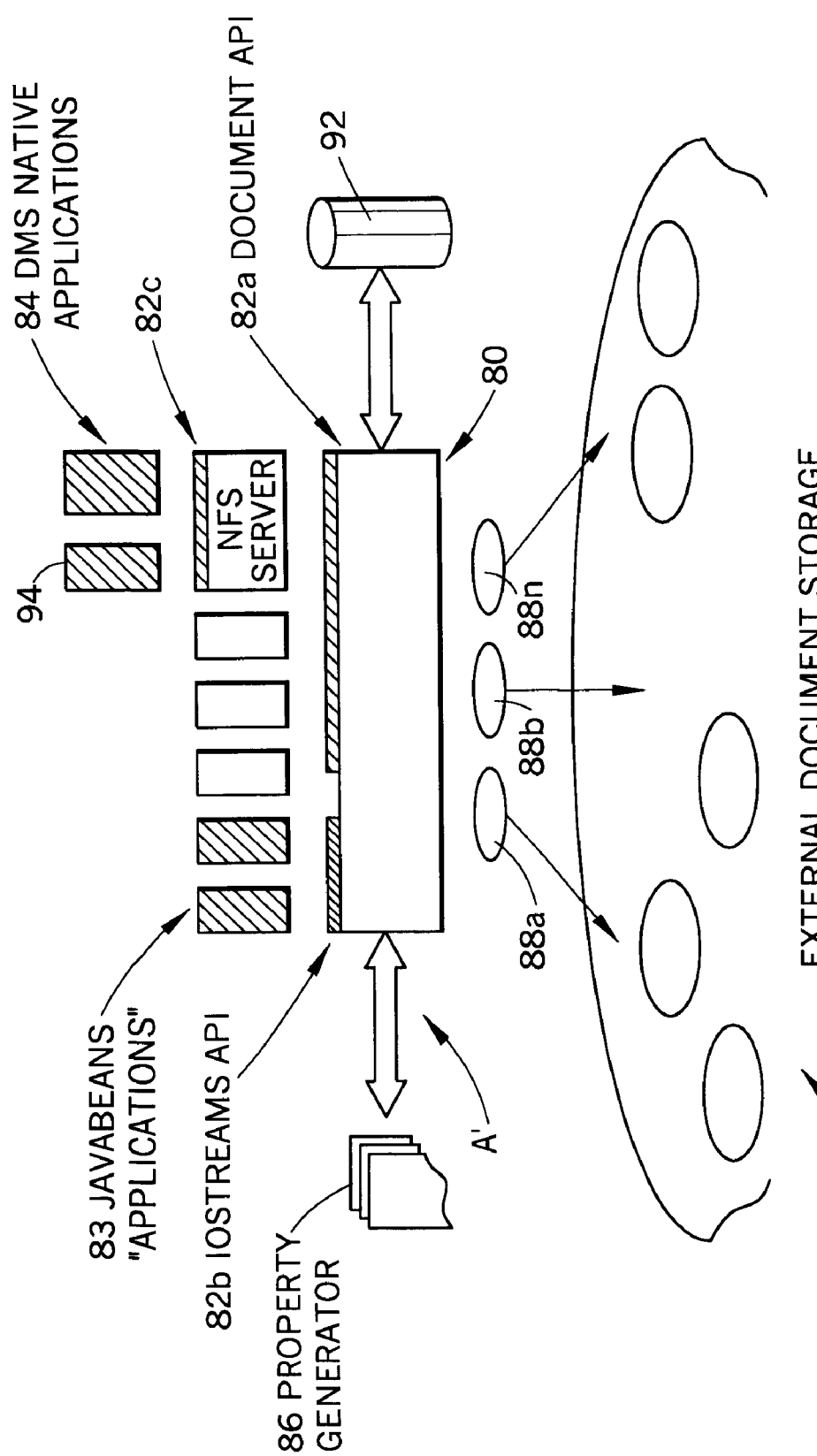
FIG. 5 sets forth a document management system of the present invention where there are applications and storage repositories which are non-DMS-aware.

Document Management System (DMS) Architecture Including Non-DMS-Aware Components As previously stated, the concepts of FIG. 3 were explained based on the assumption that the environment was DMS-aware. The discussion in connection with FIG. 5, is directed to a situation where the DMS is to be used with non-aware components.

It is noted the following discussion describes the present invention in terms of an implementation by the inventors undertaken in JAVA (JAVA and JAVA-related marks are trademarks of Sun Microsystems). It is to be appreciated that while the discussion focuses on implementation of the present invention in accordance with JAVA, there is no intent by the inventors to restrict implementation of the present invention to this language. Rather the implementation can be undertaken using a variety of different languages. Also, due to the discussion being set forth within this JAVA implementation environment, various components and/or structures would not be required if implemented in a different environment. For example, the following discussion describes three interfaces, one such interface being a standard JAVA IO-streams interface. It is to be appreciated that if described outside of this environment, the present architecture could be described with two interfaces, a DMS-aware interface and a non-DMS-aware type interface.

The core of DMS A' is document layer 80 (which includes components such as the kernels, documents, properties, and bit providers of FIG. 3), which implements the DMS document concept of providing documents with document properties. In this embodiment, DMS A' offers three levels of interface. The first is the DMS document interface 82a, a Java class model for applications that are fully DMS-aware. The DMS object model, structured in terms of document objects, properties, queries and collections, is offered to programmers as a set of classes they can use in their own programs. This is a mechanism for building new applications that exploit novel features of DMS.

The second interface is a standard Java IO-streams interface 82b, for integratable Java applications that do not understand DMS protocol. This interface is used to integrate Java Beans 83 to provide viewing and editing of particular document formats, for instance.

The third interface is a translator 82c for off-the-shelf applications 84 that are completely DMS-naïve. An example of such a translator which has been implemented is a Network File System (NFS) server (Sun Microsystems, 1989) to DMS translator, so that the DMS database can also be accessed as a regular filesystem. Applications simply read and write the filesystem as they would normally; the NFS interface serves DMS documents behind the scenes. Not only does this allow off-the-shelf applications to use the DMS, it also allows the DMS to maintain relevant document properties(such as modification dates) for activities that happen in these external applications.

Background applications are integrated into DMS through a property generator also sometimes called Services component 86. DMS property generators are applications that introduce information into the system, often processing structured files in order to turn content into properties. For example, a mail service operates on electronic mail files and processes them so that the DMS documents are annotated with details from the e-mail headers as document properties. Property generators can be scheduled to operate periodically (e.g. late at night, or every five minutes) or to act on specific events (e.g. whenever a document's contents are changed).

Documents themselves do not live in DMS, instead, DMS simply maintains the properties, while providing document content from document repositories C'. In the present embodiment, these repositories include local filesystems on each implementation platform, as well as the World Wide Web. When applications use DMS to fetch document content, the content is actually relayed from some external repository. For uniform presentation bit providers 88a–88n are provided with the capability to translate appropriate storage protocols. Properties can be located on properties database 92. This figure also illustrates a non-DMS aware browser 94.

Implementation

A limited DMS which has been implemented by the inventors comprises approximately 50000 lines of Java 1.1 code. It uses the Java Database Connection (JDBC), to talk to any SQL database backend (for properties), and DMS is currently run on PCs running Windows NT with an Oracle back-end, and on Sun workstations running Solaris using the public-domain MySQL as the back-end. The user interfaces are implemented using Swing, JavaSoft's pre-release implementation of the Java Foundation Classes. Swing is a pure Java implementation, so that the interfaces are fully cross-platform.

The following sections will describe DMS A' of FIG. 5 in more detail. Components of the system will be separated into two types—those aimed primarily at supporting the DMS model of use and interaction, and those aimed primarily at supporting the integration of the DMS system into conventional legacy environments. This division, while not absolutely clean, helps to separate the intent behind elements of the design. Both aspects, however, are needed to support the style of interaction desired from DMS.

Support For Interaction

The basic motivation behind DMS is the desire to support a new form of interaction with large document spaces. This new approach is based on high level document properties that are meaningful to users and are the primary resource for document typing, organization, searching and retrieval.

This style of interaction places a number of criteria on the design. The first is performance; since all document activity is managed through properties, then property management must be fast enough to support interaction by direct manipulation. The second is coherence, the focus should not simply be on individual documents, but across sets of documents. A third criterion is perceptual stability; although attributes, and hence document collections, are subject to continual change, no-one can use a system that is constantly changing under their feet.

These criteria are reflected in the design of those elements of the DMS architecture that deals with document properties.

The Document Layer

DMS document layer 80 provides a model of documents with arbitrary properties attached. As noted document layer 80 itself does not store the documents; instead, they are held in a variety of existing repositories C', such as standard filesystems and the World Wide Web. The document layer has three functions:

1. It unifies access to these various back-end repositories with a single document model;

2. It introduces the document attribute mechanism and provides a means to attach, remove and search document properties;

3. It adds a unified document collection service, itself based on document properties.

Document layer 80 uses a back-end database service to record the document properties. In an existing implementation, this database service is communicated to, via Java Database Connection (JDBC) so that DMS code is independent of the particular database product being used. Arbitrary properties can be associated with documents. Static properties are simple name/value pairs. While many static property values are simple strings or string lists, attribute values are stored as serialized Java Objects, so that arbitrarily complicated data structures can be recorded as document static properties. Active properties differ in that they perform some form of action either on a document or related to a document.

Document Collections

A document system organized around individual documents would be, at best, tedious to use. Most interactions in DMS A' are with documents as elements of document collection& Along with filesystem documents and Web documents, document collections are implemented as a document type, and so they are subject to all the same operations that can be applied to documents (including having associated properties, search and retrieval, and themselves being members of collections).

In the present embodiment, document collections comprise three elements (each of which can be null). The first is a query term. Query terms are specified in terms of document properties. Queries can test for the presence or absence of particular properties on a document, can test the specific value of a property, or can perform type-specific value comparisons (for instance, a wide range of date specifications can be provided, such as "changed within 2 hours" and "modified last week"). Query terms in document collections are "live." The collection contains the matching documents at any moment, so that documents may appear or disappear depending on their immediate state.

In addition to the query term, the document collection stores two lists of documents, called the inclusion and exclusion lists. Documents in the inclusion list are returned as members of the collection whether or not they match the query. Documents in the exclusion list are not returned as members of the collection even if they do match the query. When the query is null, the inclusion list effectively determines the collection contents.

So, the contents of the collection at any moment are the documents in the inclusion list, plus those matching the query, minus those in the exclusion list. We call these three-part structures "fluid collections." The goal of this implementation of document collections is to support a natural style of document organization and retrieval. A query can be used to create an initial collection, or to specify the default membership. However, membership can be refined without having to reformulate the query, but by direct manipulation of the document collection contents. Items can be added and removed to override the results of the query, and these changes will be persistent. The browser also supports the direct manipulation of query terms, so that reformulating the query is a fairly straight-forward operation.

Collections, queries and properties are the basis of all interactions with the DMS document space, and so the performance of the property engine is a key component in the DMS system. The DMS database engine provides sufficiently crisp performance to support requirements for interactive response. On a small test database (342 documents, 4911 attributes), evaluating the query "Mail.From=dourish" took 30 ms to return 8 documents, while the query "MIME Type=texthtml or MIME Type=textjava and read within 1 month" took 140 ms to return 32 documents. The same queries on a larger database (2558 documents and 27921 properties) took 90 ms (8 documents) and 620 ms (300 documents) respectively.

Property Generators

A document repository organized in terms of document properties is only of use if the documents actually have properties. There are several sources of properties on documents.

Firstly, properties can come from the principals, who are allowed to attach arbitrary properties to documents so that they can create their own structure. Indeed, a goal of the system is to allow principals to create their own structures by creating sets of properties relevant for their tasks and then using them to organize and retrieve documents. Secondly, properties are also created by active properties, applications and/or services.

However, since interesting properties can be derived from document content another mechanism provides a means for documents to be tagged with properties automatically. Some document properties are generic, such as their type, their length, their creator, the date they were created, and so forth, and these are obvious ones for DMS to maintain directly. Other relevant properties might be content-specific. For instance, an email message can be tagged with information about its header contents; or an HTML file can be tagged with information from its header, or the other document links that it contains. This functionality can be achieved through property generators.

Figure 6A:
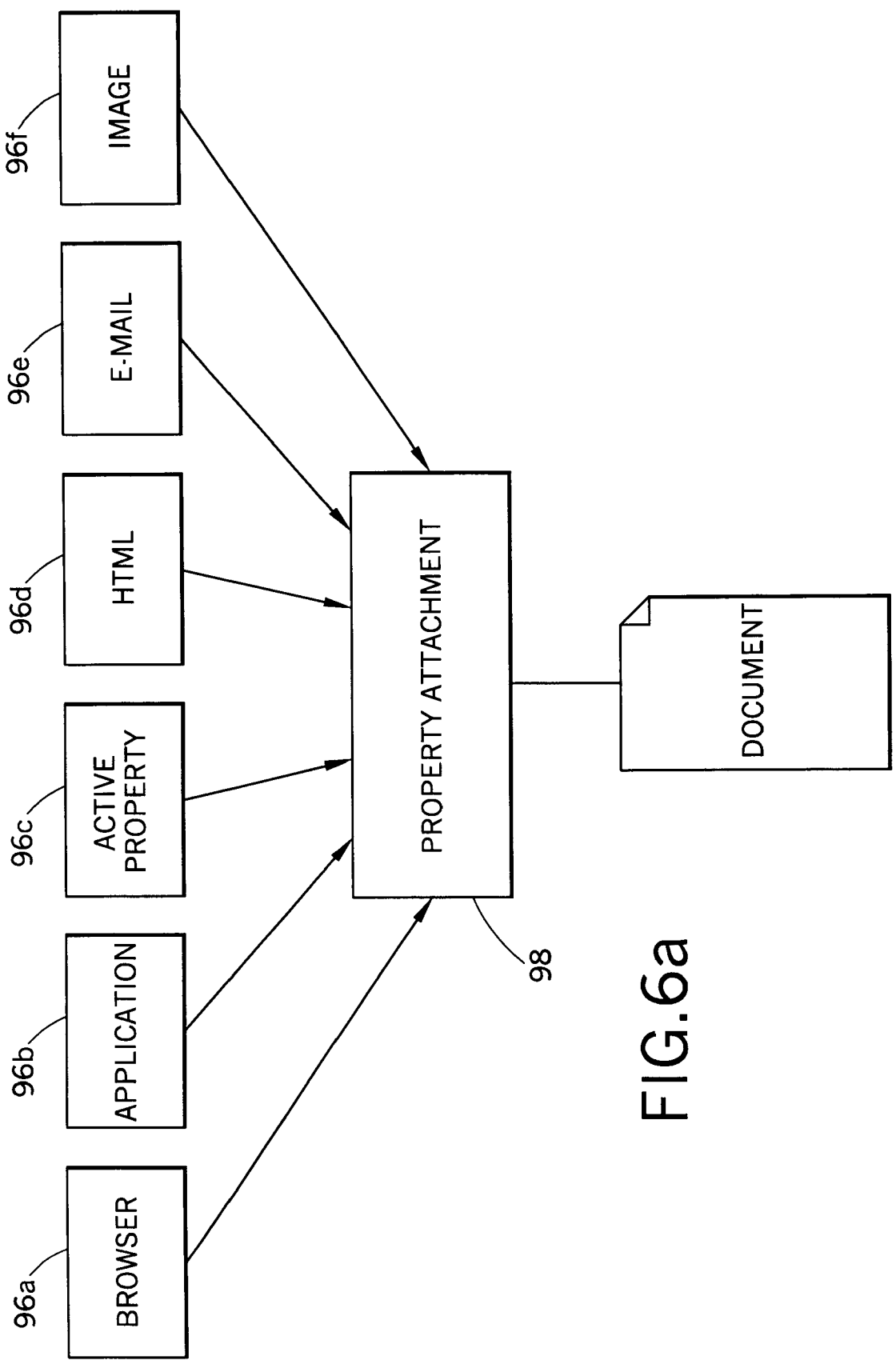
FIG. 6a shows a variety of different types of property generators of the present invention.

FIG. 6a depicts ways in which properties may be attached including, for example, through a user operating a browser 96a, by special applications 96b, or by active properties 96c. In addition properties can be attached through property generators such as, HTML property generator 96d, e-mail property generator 96e, or image property generator 96f. It is to be appreciated, as will be seen from the following discussion, these are only representative examples of property generators. Property generators can be a piece of code that can be used to analyze files in this way. Property generators are provided for common structured file types such as e-mail messages and HTML documents, as discussed above. DMS A' also provides more specialized or complicated generators; one example is a Java service which parses Java source files and can encode information about packages, imports and method definitions in properties on the document. Also provided, as a particular specialized property generator, are generator wrappers for other pieces of software that exist outside the system. For instance, a document summarization tool has been incorporated it into DMS A' through the generator mode, so that document contents will be summarized, with key words and sentences made available as document properties.

The property generator mechanism is also a route to building application-specific DMS spaces. One example is a processor that understands the format of a database of summer interns, each application record document can be tagged with the intern's skills and interests, information on their school, degree, topics of interest and so forth. DMS A' can then be used to analyze and organize the interns.

Property generators like these enhance interaction with the document space by increasing the number of available properties for any given document. Using generators to extract properties from documents allows the system to extract content information and encode it in the property-centric document structure, bridging from content-based to structural approaches.

Because DMS A' relies on generators to provide this link, it is important that they be responsive to changes in document content. Property Generators can be scheduled to run at various points in order to keep information up to date. Property Generators can run at a particular time of day (e.g. doing major processing at 4 am), at particular intervals (e.g. every ten minutes), or on particular events (e.g. when a property is added to the document, or when the document is written).

Support For Integration

A practical aspect of the everyday world is that document management systems have to be integrated and extensible. DMS A' is, after all, intended to provide support for organizing and searching existing document spaces, and existing document spaces employ a wide variety of formats, structures and applications.

The model of interaction that was the original motivation leads to new forms of document interaction, which will clearly be embodied by new applications, which can take advantage of the sorts of features DMS A' has to offer. At the same time, however, the need to support existing applications is a strong requirement for the present invention.

In order to accommodate existing applications as well as providing for the development of new ones, DMS A' offers the three application interfaces which were previously introduced. The following comments expand upon that introduction as for existing implementations.

Support for Native Applications

DMS document interface 82a provides access to documents as Java objects. Applications can make use of this interface by importing the relevant package in their Java code, and coding to the API provided for accessing documents, collections and properties. This is the standard means to build new DMS-aware applications and to experiment with new interaction models. DMS Browser 12 (of FIG. 3) can be regarded as a DMS application and is built at this level. DMS document interface 82a provides Document and Property classes, with specialized subclasses supporting all the functionality described here (such as collections, access to WWW documents, etc.). Applications can provide a direct view of DMS documents, perhaps with a content-specific visualization, or can provide a wholly different interface, using DMS as a property-based document service back-end.

Secondly, access to DMS documents is provided through a Java IOStream interface 82b. DMS IOStreams subclass the standard Java streams model, and so make DMS functionality available to any standard Java application. In the present implementation, use has been made of this model to incorporate Java Beans, such as for images and HTML files, that can provide access to document content without the overhead of starting a new application.

Support for Off-the-Shelf Applications

The third level of access is through translator 82c (a server implementing the NFS protocol). This is a native NFS server implementation in pure Java. The translator 82c (or DMS NFS server) provides access to the DMS document space to any NFS client; the server is used to allow existing off-the-shelf applications such as Microsoft Word to make use of DMS documents; on PC's, DMS simply looks like another disk to these applications, while on UNIX machines, DMS A' looks like part of the standard network filesystem.

Critically, though, what is achieved through this translator is that DMS A' is directly in the read/write path for existing or off-the-shelf applications. The alternative approach would be to attempt to post-process files written to a traditional filesystem by applications, such as Word, that could not be changed to accommodate DMS A'. By instead providing a filesystem interface directly to these applications, it makes it possible to execute relevant properties on the read/write path. Furthermore, it is ensured that relevant properties (such as ones which record when the document was last used or modified) are kept up-to-date. Even though the application is written to use filesystem information, the DMS database remains up to date, because DMS A' is the filesystem.

As part of its interface to the DMS database layer, NFS provides access to the query mechanism. Appropriately formatted directory names are interpreted as queries, which appear to "contain" the documents returned by the query. Although DMS provides this NFS service, DMS is not a storage layer. Documents actually live in other repositories. However, using the NFS layer provides uniform access to a variety of other repositories (so that documents available over the Web appear in the same space as documents in a networked file system). The combination of this uniformity along with the ability to update document properties by being in the read and write path makes the NFS service a valuable component for the desired level of integration with familiar applications.

Properties

An initial expanded explanation will be undertaken with regard to static properties and aspects of properties common to both static and active properties. A discussion directly related to active properties will follow.

The simplest properties are tags on documents. For instance, "important" or "shared with Karin" are tag properties representing facets of the document that is relevant to a document user. Only slightly more complicated are properties that are name/value pairs. For instance, "author= kedwards" is a property whose name component is "author" and value component is "kedwards". There are two things to note about these properties in the present invention. The first is that there may be multiple properties with the same name. If a document has multiple authors, it might have multiple author properties. The second is that the property's value can be arbitrary data. Although we will typically use simple test strings in our examples, we can actually store arbitrary data, or even code, as property values in our implementations.

Although they may account for a great deal of the properties that users actually see and manipulate, these static properties constitute only one component of the property mechanism. The other is active properties.

Static Properties

Properties are either directly associated with base documents or else grouped into document references that are associated with principals. Properties associated with the base document are base properties and are "published". The intent with published properties is to represent information inherent in a given document, such as its size or content type. Thus, any principal with access to the base document will be able to see or review the published properties. As such, users should not use published properties for personal information. For instance, if a property used by a principal is the property "interesting" (i.e. a user wishes to collect all documents which he has tagged with a property defined as "interesting"), such a property is rarely inherent.

The properties on a document or reference can themselves be hierarchically structured. That is, properties can have sub-properties. Since sub-properties must attach to a parent property, a parent property must be explicitly created before sub-properties can be added. Parent properties must be explicitly deleted as well; removing the last child of a property does not automatically remove the parent. By enforcing the existence of parent properties, a uniform way to enumerate the hierarchy one level at a time is guaranteed (namely, getSub=Properties( ) can return only the next level of properties.)

Each property has a name. This means that hierarchical names can be used to traverse the hierarchy. For example, "Get me the 'from' sub-property of the 'mail' property of this reference to Grandma's cookie recipe" would start at the reference, find the property named 'mail', and find its sub-property named 'from'.

Any level of the hierarchy may have multiple properties with the same name. For example, a principal could add both 'author=john' and 'author=joe' on the same document, and each could have its own sub-properties further describing the author. Queries for either property will identify the targeted document. When the principal asks for the value of a property, they can use one of several methods. A standard getValue( ) will return a single value and throw an exception if there is no such value or if there is more than one. Other variations could return a value even if there is more than one, or return all of the values.

The value of static properties can be any serializable Java Object (or null). No typing guarantees are made about any property value. Principals must rely upon conventions to store and retrieve compatible types via properties. Properties can contain arbitrary values, but a principal is encouraged to keep their size small. Large property values should probably be stored as references to other documents. The string representation of the Java Object that is the value of a property is used when searching for properties by value by default.

The visibility of a property is accomplished by a tag placed by the applier of the property. The value of the tag can be private or public. Private properties are not visible to any principal other than the author; public properties are visible to any requesting principal. So when another principal requests the set of properties, all public properties will be returned and no private ones. All base properties on the base document are marked public, so published properties are visible to all users.

When a property is added to a document, the identity of the adder is recorded with the property. If multiple principals add the same property (with the same value), and one decides to remove the property, only the one that the principal had previously added is removed. This approach serves as an alternative to tagging the document with only one copy of the property and then having the first principal mistakenly remove the property when the second intends that it remain.

In addition to any sub-properties, each property also has a fixed set of attributes recorded about it. These may be thought of as properties on properties, except that the per-property attributes are not extensible. The private/public tags discussed previously, as well as the identity of a property's adder, are examples of per-property attributes. Other examples include when the property was added and whether the property should be displayed by browsers.

FIG. 6b provides a Java coded example for a program that adds the property "coolness=high" to all documents related to DMS A', and creates a collection containing all documents for which the property is set. The first step is to initialize the database. DMS A' can be set up to manage a database locally (within the application's address space) or to connect to a remote DMS architecture; for this example, requests will be handled locally. The call to DMS.startMysqlDatabase( )initializes a database object for a MySQL database. A query is then constructed for the documents that are wanted by giving a search term to a query constructor. A query doesn't have to be encapsulated in a collection; it can be directly evaluated using the find( ) method. This can take an argument specifying a list of documents against which the query should be evaluated; if the list is omitted, as in this case, then the query is run over the entire database. It returns a DocList object containing matching documents. An enumeration for these documents can be obtained in order to process them one by one, setting the desired property.

Now a new collection is created containing a dynamic query. The method createCollection( ) creates and returns a new collection. The collection can then be named. The name property is actually "DMS", but a number of common DMS properties are provided statically in the class DMSItem. The query is set for the collection using the setQuery( ) method and then print the number of matching documents. This time, since the query is encapsulated in a collection, it will persist in the database and still be there next time a DMS application is started. Finally, an exit is accomplished.

As a summary of the preceding discussion, set out below are key aspects of properties:

Properties can be stored in a hierarchy underneath each document.

A combination of property hierarchies and hidden properties solve the problem of name space collections and managing large sets of properties.

The same named property can be added to a document multiple times. Various getValue methods on that property can return one of the values, all of the values, or a single value with notification when there is more than one available (when you only expected one).

By making multiple property values each be their own property, querying over multiple values becomes the same as querying over singleton properties.

Properties can be tagged private or public. Private is not accessible by anyone but the owner. Public is accessible by anyone with access to the document.

Properties can enforce finer-grained access control if desired.

The query language allows principals to specify which properties on which documents they're interested in.

A property value can be an arbitrary serializable Java Object.

With each property, the system stores the reason it is on the document, e.g. who placed it there. Then, if a property is asserted for more than one reason, and one reason is later removed, only the appropriate instance of the property will be removed and the document will retain the property due to the other reason.

Independent principals are allowed to place and remove properties while disregarding others' uses of that property.

Active Properties

The static properties described above attach data to documents. They record information which can subsequently be searched or retrieved. However, some properties of documents have consequences for the way in which users should interact with them, and for the behavior of those documents in interaction. Consider the property "private." Simply marking a document as private is generally not enough to ensure that the document will not be read by others. So the "private" property should be more than a tag; it should also be a means to control how the document is accessed.

The active property mechanism provides a means to provide behaviors such as that required by properties like "private" which affect not only the document's status but also its behavior. At the same time, active properties afford this sort of interactive control in a way that maintains the advantages of a property-based system: document-centric, meaningful to users, and controlled by the document consumer.

Active properties can be attached to documents just like static properties, but they also contain program code which is involved in performing document operations. Active properties can be notified when operations take place, as discussed in connection with FIG. 4d. They can also be involved in validating those operations in the first place; or they can get involved in performing the operation. At each of these points, the active property can execute program code. Notification can be used, for example, to maintain awareness of parallel work in a collaborative system; it provides a means for a property to find out about the operations on a given document and log them or make them visible in a user interface. Verification can be used to implement mechanisms such as the "private" property described above, which would refuse validation to read requests originating from anyone other than the document's owner. And a chain of properties helping to perform the operation can be used to provide facilities such as encryption and compression as properties on documents.

Active properties are properties that are activated by being associated with code. In particular, a property can be associated with a Java class. Each property can have its own class, though in one embodiment properties of the same "type" can share a class. This class contains methods corresponding to various operations on the document. For example, properties may provide their own read methods that are "stacked" on top of the read operation provided by the base document.

As a full-fledged object, a property instance object can interact in multiple ways to carry out its activity. These standard mechanisms of notifying, validating and performing introduced above, are expanded upon below, where the standard mechanisms it can participate and include:

It can be consulted on attempts to add, remove, or change information on the property. This allows it to validate the property information, carry out any initialization needed to achieve its effect, and turn off such activities when it is removed.

It can ask to intercept various operations on its document. This allows it to monitor or alter the behavior of its document or other properties of its document.

It can ask for notifications of activity in its or other document spaces. This allows it to maintain information that spans documents, such as updating conferred or inferred properties.

API's it implements can be accessed by other entities, either inside or outside the document space. This allows it to effectively extend the basic API of its document.

It can invoke the API's of its own or other documents or their properties. This enables behavior that involves several documents.

All active properties have three essential features: a name, a value, and active methods. Thus, any property can be made active by giving it active methods. Even properties thought of as being static are in some ways active since their getValue and setValue methods are provided by their class object. The value of a property can be used by its active methods to store persistent data associated with the property.

For any given operation that may be performed on a document, an active property can carry up to three methods. The first is a (boolean) validation method; the second is a (Object) primary method, and the third is a (void) notification method. When an operation is to be performed, the kernel first executes defined validation methods on attached properties for that operation. If any method returns false, execution halts. Otherwise, the primary methods are run according to the defined ordering rule. Finally, all notification methods are run.

The following paragraphs (i–xi) describe characteristics of active properties including:

(i) Property State Storage

A property state can be stored as the value of the property, as sub-properties of the active property, as other properties on the same document, as separate documents, or in an external storage system. This decision is up to the property writer (although the use of property values and sub-properties is encouraged).

No special storage mechanism for properties results in less complexity.

(ii) Active Properties are Object Instances, Which are Ephemeral

The property instance object must exist when the active property's code is running, but otherwise it exists only when the kernel finds it convenient. The kernel's policy may range from keeping the object around indefinitely, to it creating the object only when the active property is supposed to perform some action, and then discarding it upon completion of the action. There is one instance of an object extant for any property instance.

Locating the activity in Java objects is lighter weight than putting it in threads. Putting it in ephemeral objects is even lighter weight and further ensures that all the state the property depends on is visible as property values. This also gives a clear separation between the information in properties, which is searchable, and their activity. This design does mean that property implementers may have to work harder since they can't keep any inter-execution state except that in their properties or in other properties (or documents).

(iii) Conditions for the Property are Controlled by its Object

The object is invoked to check attempts to add, remove, or change property instances. For adding a property, the object is constructed in accordance with the information, and addSelf( ) is called, which checks that the addition is valid and performs any appropriate initialization. It returns a status saying whether the addition is acceptable—if it is not acceptable, the property is not added to the document. Similarly, removeSelf( ) is called on attempts to remove the property, changeSelf(Property newProp) is called for an attempt to change the value of the property, with newProp representing the value that is to be newly stored.

(iv) There are Two Scopes for Property Operations: Document and Property

Document-scope operations are executed independently of any property. They logically take the form document.operation(args). The actions taken for this type of operation can be overridden by any property on the document, but overriding operations take the same set of arguments as the existing operation. (see intercepting and modifying behavior below).

Property-scope operations are executed with respect to a property. They logically take the form document.property.operation(args).

(v) Documents and Properties can Describe the Operations They Offer

A description of the parameters and arguments required by various operations is available.

API's implemented by properties can be accessed by anything with access to the document.

Users of the system and other properties can invoke active property operations by first calling a GetDelegateForInterface( ) to obtain interfaces that are implemented by the active property.

(vi) Activity and Behavior can be Intercepted and Modified.

A property can register to intervene in operations on its document. The base operations that can be intercepted include: reading and writing content and adding, changing, and removing properties. Interceptions of property operations apply to operations on the same reference as the intercepting property. Interceptions of content operations by properties on references apply to accesses made from the document space on which the reference lives.

Since properties are supposed to be properties of their document or their principal's view (or document handle) of the document, it makes sense that they can affect that. Properties can use the notification mechanism and various API's if they want to interact with other documents.

(vi) Property Execution Consists of Validation, Execution and Notification Phases Properties carry methods for validation and notification as well as primary methods for execution. An operation must be declared as valid by all attached properties before it is performed.

Separating method execution into these phases simplifies property ordering. Validation allows methods to override other executions on a case-by-case basis. Validation and notification correspond to natural classes of behavior.

(vii) Active Methods are Ordered

The active properties on a document are ordered in a list or vector. The order of invocation of primary methods follows the property order, but in a stack style. The first property that has a primary method gets its method invoked and passed a handle that allows it to execute the stack of remaining primary methods in similar fashion. Thus, any method in the stack can transform the arguments for subsequent methods, can revise the result passed back by the stack of subsequent methods, or can not call the subsequent methods at all. (Order does not matter for validation or notification methods, since they can't have an affect on each other.)

These are mechanisms for property-list reordering.

(viii) Base Operations are Executed After All of the Reference Operations

Operations on the base document are combined with operations on the references, but executed last regardless of when the properties were added. For instance, on a read, all of the reference reads are executed before any of the base reads. The BitProvider property always has the last say in read/write operations.

(ix) Property Methods are Parameterized by the Principal Causing the Operation to Occur An identifier for the principal requesting the operation is passed to each active property method. This allows any active property code to alter its behavior based on who is performing the operation.

This is especially important for access control and notification schemes that are implemented directly in the properties.

Interaction With Properties Through the Use of a Browser

The previous discussion introduced elements and concepts of the DMS architecture. It is to be noted that DMS A or A' are designed to allow principals to interact with documents in the document space. Browsers (such as Browser 12 of FIG. 1 and Browser 94 of FIG. 5) provide one manner for such interaction by allowing a principal a very direct sense of interaction with attributes and with collections organized according to document attributes.

Figure 7:
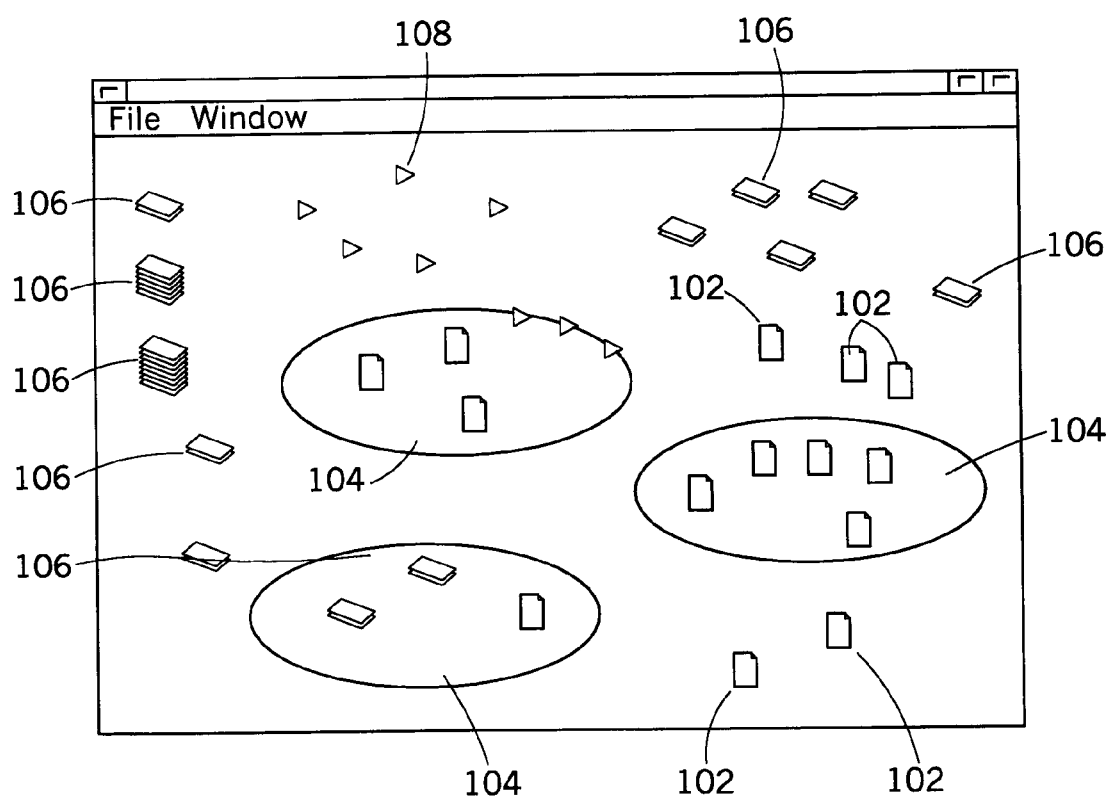
FIG. 7 illustrates the concepts of the present invention implemented by a browser as shown on a computer screen.

FIG. 7 shows a browser in use. There are four basic entities being displayed. Documents 102 are displayed as individual entities and can be moved, deleted and launched. Document collections appear in two forms; opened as ovals 104, showing the documents they contain, and closed, as "piles" 106. A concept of piles is discussed in the article, "A Pile Metaphor for Supporting Casual Organization of Information", by R. Mander, G. Salomon and Y. Y. Wong, PROC. ACM Conf. Human Factors in Computing Systems, CHI 92 (Monterrey, Calif.), May, 1992. Displaying closed collections as piles 106 provides a natural means to give cues as to their size, which is particularly useful since fluid collections can grow and shrink independently from user activity.

Individual properties can also be stored as browser objects, and appear on the desktop as triangles 108. Properties have two roles in use with a browser. The first is that they can be dropped onto documents to add a particular property to the document. The second is that individual properties can be used as query terms.

Recall that collections can not only contain specific other documents (including sub-collections), just like folders and directories in traditional file systems, but that they can also contain a query component, which specifies dynamic content. So, for any collection, a principal can specify a set of query terms. Documents in the system that match the query will be included in the collection (unless they have been specifically excluded).

Query terms can be specified by using a traditional dialog box interface, but also by direct manipulation, through the property icons (triangles in this embodiment, though other designs could also be used) 108. Dragging a property onto an open collection adds it to the list of query terms for that collection. So, if the property is "project=DMS", then that property can not only be added to documents, but can also be dropped onto a collection so that "project=DMS" is added to the current set of query terms for that collection.

Figure 8:
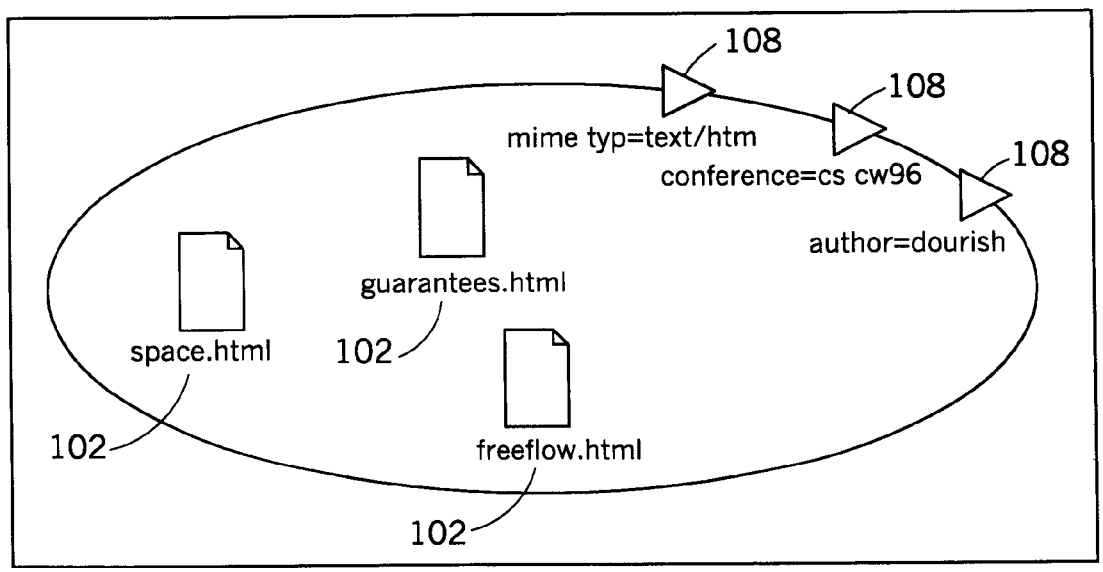
FIG. 8 is a close-up view of FIG. 7.

As shown in FIG. 8, property icons 108 representing the current set of query terms appear around the circumference of the collection object. Dragging these query terms off the collection again removes them from the query. As these iconic representations of query terms are dragged on and off the query object, the query is updated in a separate thread. The result is that queries dynamically respond to the manipulation of query terms in real time, giving a very direct sense of the query as a configurable filter on the document space.

The browser being used is configured so that for a principal implementing collections with a query component it still feels like a manipulation of collections, and not the generation of queries. The interactive style of a browser intends to describe the interaction grounded in manipulation of a document space rather than the creation and execution of queries. While in the foregoing, it has been noted that query terms help to give a sense of manipulation, it is appreciated other components of collections, inclusion and exclusion lists, can also be used to help support the experience of manipulation.

Inclusion and exclusion lists in fluid collections, previously discussed, lend them a feeling of stability that is critical to the interactive field being supported. So, in addition to the query component that dynamically maintains the collection contents, direct manipulation controls the use of the inclusion and exclusion list to modify the results. Dragging a document out of a query collection causes it to be added to the exclusion list for the collection. This means it won't reappear in the collection the next time the query is run (which happens regularly in the background). Similarly, dragging a document into a collection means that it should be added to the inclusion list since it would otherwise not be included as an element of the collection. Using this mechanism, principals can drop properties onto a query window to create the query that expresses their basic set of interests, and then refine the results by adding or removing specific items. The resulting collections feel more like "real" entities than dynamically executed queries, but new documents of interest still are included when they are added to the system.

Multiple documents are allowed to appear in a workspace, but avoid the situation where two documents appear in the same context—that is, a document cannot appear more than once in any given collection, or more than once on the desktop. If the user attempts to move a document into a context where it already appears, then the "second" appearance will merge with the first when the user releases the mouse.

Figure 9:
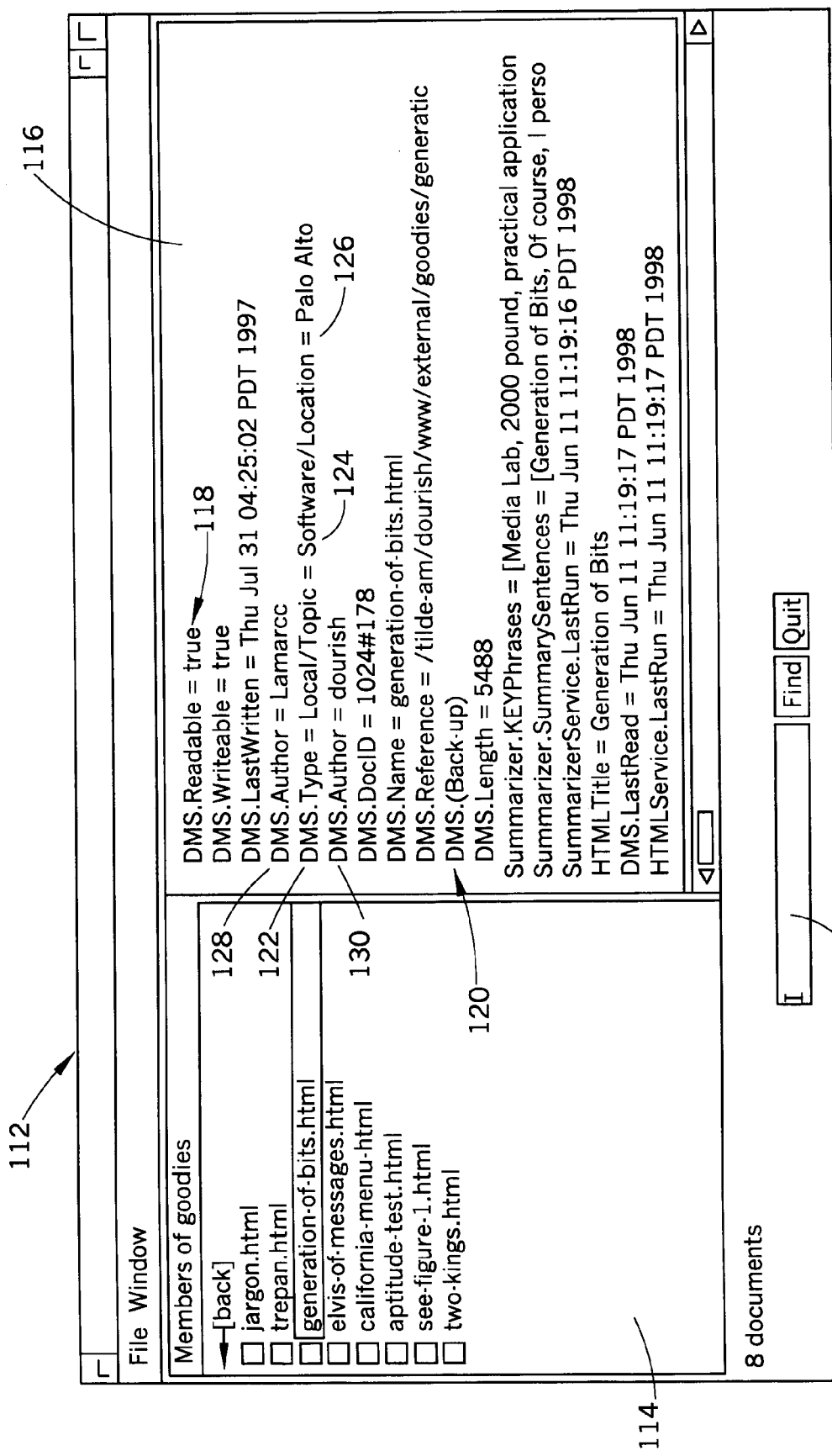
FIG. 9 shows a listing of a collection of documents and a listing of properties attached to one of those documents.

As previously mentioned and as shown in FIG. 9, a dialog box 110 of display screen 112 can also be used to alter properties on documents. Particularly, as shown in FIG. 9, the collection "goodies" includes a document "generation—of—bits—html." This information is shown in the display area 114. As the document "generation—of—bits—html" is highlighted, property list window display 116 displays static properties 118 and active properties 120 that are attached to that document. Properties may be added or removed or otherwise searched via the use of dialog box 110. It is also noted that the displayed property list illustrates that properties can contain arbitrary data. Property list window display 116 includes a parent property 122 to which are attached sub-properties or child properties 122–126. This figure further shows that multiple properties can have the same name 128,130.

The invention has been described with reference to the preferred embodiment. Obviously, modifications and alterations will occur to others upon reading and understanding this specification. It is intended to include all such modifications and alterations in so far as they come within the scope of the appended claims or the equivalents thereof.

Having thus described the present invention, we now claim:

1. A document management system for managing documents comprising:
    a means for providing properties related to characteristics of documents as static properties and behaviors of documents as active properties, wherein said active properties include at least one of altering content of documents, notification of other documents, notification of external sources and causing said other documents and/or external sources to perform a function;
    a means for providing a user of the document management system with access to the properties;
    a means for attaching, by the user, selected ones of the properties to a selected document;
    a means for separating content of the selected document from the properties of the selected document;
    a means for storing the content and the properties of the selected document at different locations; and
    a means for retrieving the selected document based upon at least one of the attached properties.

2. The method according to claim 1 wherein the properties are extensible and arbitrary, whereby an unlimited amount of properties may be attached to the document of the document management system.

3. A method of managing documents by use of a document management system of a computer system which includes at least one application for issuing instructions and at least one data storage repository for storing documents, the method comprising:
    providing a first user of the computer system with access to properties of the document management system, wherein said properties include behaviors of documents as active properties further including at least one of:
        altering content of documents;
        notification of other documents;
        notification of external sources; and
        causing said other documents and/or external sources to perform a function;
    attaching, by the first user, first selected ones of the properties to a document of the document management system;
    storing the attached first selected properties;
    storing the content of the first document separate from the location where the first selected properties are stored;
    managing the content of the document separate from the properties of the document;
    retrieving the first document using at least one of the attached first selected properties, the retrieving including a step of retrieving the content of the first document;
    modifying content of the retrieved first document for selected properties configured to modify documents; and
    notifying other documents or external sources of actions performed on the retrieved first document for selected properties configured to cause said notification.

4. The method according to claim 3 further comprising:
    providing a second user access to the properties;
    attaching, by the second user, second selected ones of the properties to a second document, at least one of the second selected properties being different from the first selected properties, and wherein content of the second document is the first document content;
    storing the attached second selected properties whereby the content of the second document, which is the content of the first document, is stored separate from the properties of the second document; and
    managing the second selected properties independently of the first selected properties.

5. The method according to claim 4 wherein the first document is configured as a base document, and the properties attached thereto include at least base properties.

6. The method according to claim 5 wherein the second document is a reference document to the base document, and the properties attached thereto are reference properties.

7. The method according to claim 6 further comprising:
    viewing, by the second user, the base properties attached by the first user and the second selected properties attached by the second user.

8. The method according to claim 6 further comprising:
    retrieving the content of the second document using at least one of the base properties and reference properties.

9. The method according to claim 7 further comprising:
    making selected ones of the second document's reference properties public and others of the reference properties private, wherein a third user viewing the document of the second user will be able to view the public properties but will not be able to view the private properties.

10. The method according to claim 3 further comprising:
    delivering the properties to the document management system through a single interface.

11. The method according to claim 3 wherein the properties are extensible and arbitrary, whereby an unlimited amount of properties may be attached to the document of the document management system.

12. The method according to claim 3 wherein the properties are one of static properties and active properties.

13. The method according to claim 12 wherein static properties are one of tags and a name-value pair associated with the document.

14. The method according to claim 12 wherein active properties include code which allows the use of computational power to either alter the document to which it is attached or effect another change within the document management system.

15. The method according to claim 3 further comprising:
    attaching properties to a plurality of documents of the document management system; and
    forming collections of documents in accordance with properties attached to the documents, wherein documents having the same property are included in the same collection.

16. The method according to claim 15 wherein a single document appears in multiple collections.

17. The method according to claim 15 wherein a collection includes a plurality of documents each of whose contents are located at locations other than with the document collection.

18. The method according to claim 15 wherein collections are one of transient, and persistent.

19. The method according to claim 3 further comprising:

attaching properties to a plurality of documents of the document management system; and applying a query across the properties of the document management system, wherein documents having a property attached corresponding to the query are returned and form a document collection.

20. The method according to claim 19 further including:

providing an inclusion list to override the results of the query by adding a document to a collection even though the document was not returned by the query; and providing an exclusion list to override the results of the query by deleting a document from the collection, which was returned by the query.

21. A document management system comprising:

a system user interface configured to allow a plurality of users to use the system;

a document management layer containing a plurality of properties, wherein said properties include behaviors of documents as active properties further including at least one of:

altering content of documents;

notification of other documents;

notification of external sources; and causing said other documents and/or external sources to perform a function;

a property attachment mechanism for attaching selected ones of the properties to a selected document, wherein the document attachment mechanism is controlled by a user of the system;

a mechanism for storing the properties attached to the document and content of the document at separate locations; and a mechanism for retrieving the document based on the attached properties.

22. The system according to claim 21 wherein a document is defined as having only properties.

23. The system according to claim 21 wherein the document is defined as a collection, which includes members of the collection with no content of the members.

24. The system according to claim 21 wherein the document contains both properties and content.

* * * * *